United States Patent Office
3,191,703
Patented June 29, 1965

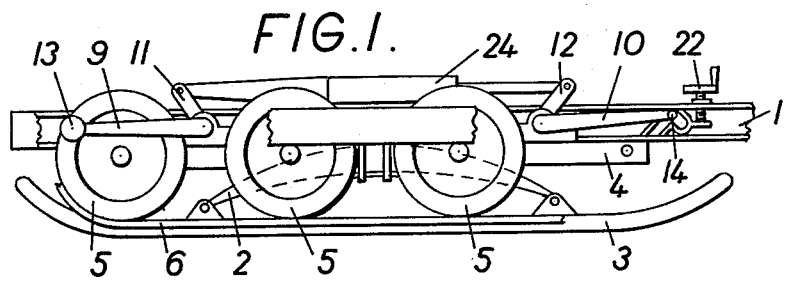
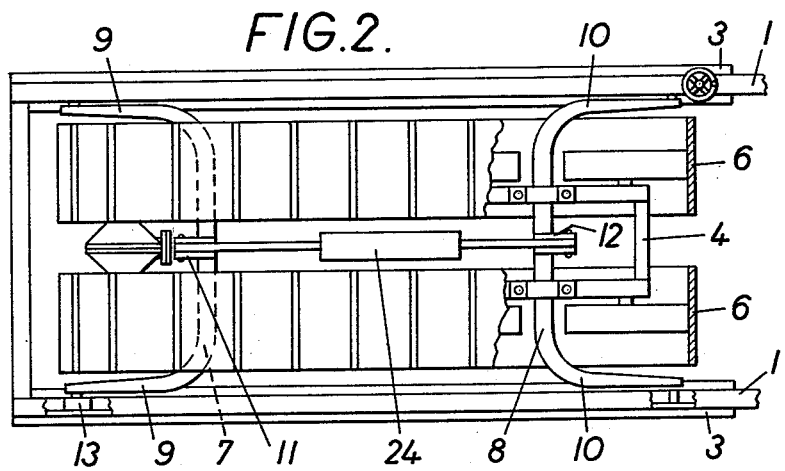
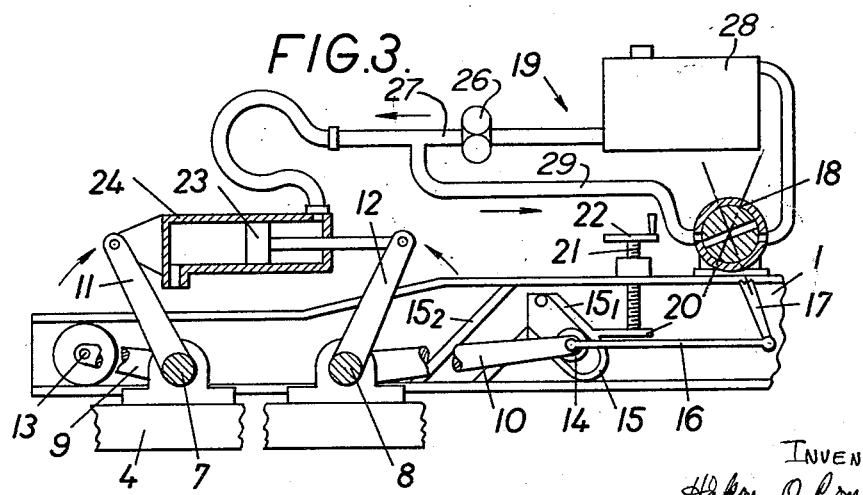

3,191,703
VEHICLE WITH ENDLESS TRACKS SELF-
ELEVATABLE RELATIVE TO SKIDS
Håkon Ole Romsdal, Marcellis Gate 27, Oslo, Norway
Filed Mar. 13, 1963, Ser. No. 264,949
Claims priority, application Norway, Mar. 16, 1962,
143,679
4 Claims. (Cl. 180—5)

The present invention relates to a belt driven vehicle of the type wherein one or more parallel driving belts are arranged between skids, skis, wheels or belts which are mounted at the sides of the fixed frame of the vehicle, in such a manner that the driving belt or belts may be raised or lowered relatively to the vehicle frame and thereby relatively to the skids or the like, for the purpose of adjusting the support pressure between the driving belt or belts and the ground according to the condition of the latter, in particular according to the road conditions when driving along snow covered ground.

In order to achieve this mobility or adjustability of the driving belt or belts relatively to the vehicle frame, it is previously known to mount the driving and supporting wheels of the driving belt or belts in a particular belt frame which is connected to the vehicle frame in such a manner that it may be adjusted, not only in a vertical direction, but also in an oblique direction in a vertical plane, for instance by means of obliquely situated hydraulic or pneumatic cylinder and piston arrangements.

It is an object of the present invention to provide an even greater, more flexible and quicker possibility of adjustment of the belt frame with driving belt or belts relatively to the vehicle frame. According to the invention, this is achieved by including in the connecting system between the belt frame and the vehicle frame not only one or more flat or curved oblique guide faces situated in the vehicle frame but also one or more control means which are pivotably mounted in the belt frame and adapted to follow the guide faces during their pivotal movement and thereby adjust the relative position of the two frames. Due to the fact that the guide faces are extending obliquely in a vertical plane parallel to the direction of length of the two frames, a pivotal movement of the control means will cause the two frames to perform a uniform relative movement, a movement which is easily and simply controllable at wish.

In a suitable embodiment of the arrangement of the invention, wherein the connection between the belt and vehicle frames comprises one or more transversely extending shafts which are mounted in the belt frame and the ends of which are elbow bent so as to form arms the ends of which may slide and swing in the vehicle frame, the said arms of at least one transverse shaft are, in accordance with the invention, adapted to cooperate with a corresponding oblique face in the vehicle frame, at the same time as each of two transverse shafts is provided with an additional arm which extends at right angles to the shaft axis, the free ends of such arms being interconnected through a hydraulic cylinder and piston arrangement. Thus, by means of this hydraulic arrangement, the two shafts may be rotated at will relatively to each other, whereby the bent arms of at least one of the said shafts, by following the oblique guide face will cause the desired adjustment of the relative position of the two frames, and thereby of the driving belts relatively to the supporting means, such as the skids.

For the purpose of obtaining an automatic adjustment of the position of the driving belts relatively to the skids, so that the belts automatically follow inequalities in the ground, one of the arms which cooperate with an oblique face may be connected to the control means of a valve in the hydraulic system of the connection between the free ends of the remaining arms of the transverse shafts. Hereby, any movement of the control arm along its oblique face is automatically accompanied by an adjustment of the pressure conditions in the hydraulic connection, and thereby by an adjustment of the belt position.

For the purpose of adapting the arrangement for running of the vehicle in both directions, the oblique guide face may be made in the form of a V, one leg of the V appertaining to one direction of running.

In the accompanying drawing, in which an embodiment of a vehicle according to the invention is schematically illustrated, merely such parts of the vehicle are shown as are required for a good understanding of the principles of the invention.

FIGURE 1 is a side view of the driving means of the vehicle.

FIGURE 2 is a plan view of the same.

FIGURE 3 is a vertical sectional view, at a larger scale, of the connecting system between the driving belt frame and the vehicle frame.

In the drawing, 1 is the fixed frame of the vehicle in which skids 3 are mounted by means of suitable spring means 2. 4 is the driving belt frame in which driving and supporting wheels 5 are mounted for a pair of parallelly extending driving belts 6. In FIGURE 1, the belt 6 is only partly shown and one supporting wheel in the foremost end of the arrangement is deleted for the purpose of disclosing the parts situated behind the same. Two transversely extending shafts 7 and 8 are rotatably journaled on the belt frame 4, each shaft being at both ends so bent as to form lever arms 9 and 10 respectively, extending approximately at right angles to the axis of the respective shaft 7, 8. Between the arms 9 or 10, respectively, each of the shafts 7, 8 is provided with an additional arm 11, 12 respectively also extending at right angles to the shaft axis. The free ends of the arms 9 are pivotably connected at 13 to the vehicle frame 1, while the free end of one of the arms 10 is provided with a roller 14 adapted to cooperate with an angle formed guide 15 in the vehicle frame, the guiding faces of the guide 15 being angularly arranged in a vertical plane relatively to the direction of length of the vehicle, the portions $15_1$ and $15_2$ of the guide face of the guide 15 sloping forwardly and rearwardly, respectively. One of the arms 10 is also, at the free end, through a rod 16 connected to the adjustment arm 17 of a valve 18 in a hydraulic system which is generally indicated at 19. The guide 15 is also provided with a projection 20 adapted to cooperate with a setting screw 21 which may be adjusted by means of a handle 22 for the purpose of adjusting the oblique position of the guide face $15_1$.

As is shown in FIGURE 3, the hydraulic system 19 includes a pump 26 for delivering fluid under pressure through conduit 27 from a reservoir 28 to one end of the hydraulic cylinder 24, thereby to urge the free ends of lever arms 11 and 12 toward each other about the fulcrums afforded by their pivotal connections 13 and 14 respectively to the vehicle frame 1. This results in urging the belt frame 4 downwardly against the ground. The valve 18 above referred to controls the return flow of fluid through a bypass conduit 29 from the output side of the pump 26 back to the reservoir 28. Thus, when valve 18 is opened (either partially or wholly) to permit the bypassing of fluid from the pump back to the reservoir, the resulting downward thrust or pressure on the belt frame 4 will be decreased or substantially discontinued depending on the extent to which the valve 18 is open. This will permit raising of the frame 4 with respect to the main vehicle frame 1.

The arrangement operates in the following manner:

When the vehicle is at rest, with the engine for the belt drive and for the hydraulic system running, the weight of the vehicle is supported by the fixed skids, and the belt arrangement is engaging the ground merely with its own weight. It is primarily to be assumed that the piston 23 is in an intermediate position in the cylinder 24 and that the valve 18 is then open so that the piston is pressure released, or in other words may move to the right in FIGURE 3 to permit raising of the belt frame 4. When starting the belt drive, the supporting pressure between the belts and the ground is initially not sufficient to cause any forward movement of the vehicle, but driving engagement of the belt with the ground will urge the entire belt unit slightly forwardly relatively to the vehicle frame. Thereby the roller 14 is pushed forwardly, i.e. downwardly towards the bottom of the vertically inclined guide face $15_1$, whereby the rod 16 and the valve arm 17 are moved towards right in FIGURE 3 so that the passage through the valve 18 is closed to maintain pressure in cylinder 24 tending to draw toward each other the free ends of the lever arms 11 and 12. The resulting downward swinging force acting on the lever arms 9 and 10 respectively, to urge them downwardly about the fulcrums defined by the pivotal connections 13 and 14 to the vehicle frame 1, presses the belts 6 downward into driving engagement with the ground. Since the entire belt frame 4 and lever arms 11 and 12 are at this time moving as a unit, such movement requires no change in spacing in the free arms 11 and 12 and therefore the position of the piston 23 in the cylinder 24 need not be changed. Driving engagement of the belts with the ground tends constantly to drive the belt frame forwardly with respect to the vehicle frame 1. If the belts 6 encounter increased resistance to their forward travel, in the form of a knoll or rise in the ground level, their action in following the ground contour will cause the belts and belt frame to rise vertically relatively to the skids 3. Such upward displacement of the belt frame 4 results in upward displacement of the roller 14 along the guide face $15_1$ to open the valve 18 and release the fluid pressure from cylinder 24 so that the hold-down force which the hydraulic unit normally exerts on the belt frame is released or substantially reduced to permit the rising of the belt frame. When the knoll is passed, the belt frame is again moving slightly forwardly, as described above, with the result that the passage through the valve 18 is again reduced, possibly fully closed, so that the belts are again pressed downwardly. In this manner, the belts are always maintained in engagement with the ground with no necessity for the driver to adjust the gas supply to the driving engine, due to the fact that, during smooth running, an equilibrium is established wherein the oblique position of the guide face determines the position of the roller 14 and thereby the opening condition of the valve 18. Due to the fact that the belt unit is suspended in the frame 1 through the roller 14 in the oblique guide 15, the reaction between the two frames is decomposed into one component extending at right angles to the guide face and another component extending parallel to the same.

For the purpose of obtaining a similar automatic adjustment of the belts relatively to the vehicle frame under rearward driving, the guide 15 is provided with a second face $15_2$ extending at an angle to the direction of length, opposite to the angle formed by the face $15_1$.

In the embodiment shown in the drawing including a single acting hydraulic arrangement 23, 24, the belts could not be raised to a position relatively to the skids, higher than the level of the latter. If further raising be desirable, the arrangement 23, 24 may be made double acting, so that the piston may be positively urged in both directions.

Due to the fact that the belt unit according to the invention is freely suspended between the ends of the arms 9 and 10 in the frame 1, the hydraulic arrangement 23, 24 being without any fixed point in the frame 1, the unit will be able to follow inequalities in the ground while maintaining a full forward motion and with no necessity to follow the vertical movement of the skids when the latter are passing such inequalities. Thus, the system comprising the parts 9, 7, 11, 24, 23, 12, 8 and 10 is forming a unit which is flexibly moveable relatively to the frame 1.

I claim:

1. In a belt driven vehicle of the class which includes at least one driving belt positioned between skids, skis, wheels or belts mounted along the side faces of a fixed vehicle frame, driving and supporting wheels for the driving belt mounted in a belt frame, a flexible connecting system between the said vehicle frame and the said belt frame permitting the latter to adopt various height and oblique positions relatively to the former, the improvement wherein the said connecting system includes at least one guide means situated in the vehicle frame and at least one control means pivotably mounted in the belt frame and cooperating with the said guide means so as to permit an adjustment of the relative position of the two said frames, said connecting system comprising between the belt and vehicle frames a pair of transversely extending shafts supported in the belt frame and provided with elbow bent arms forming end portions, an oblique face in said vehicle frame guide means associated and in engagement with said elbow bent arms, each shaft further provided with an arm extending at right angles to the shaft axis and a hydraulic cylinder and piston arrangement interconnecting the free ends of said last named arms.

2. In a belt driven vehicle of the class which includes at least one driving belt positioned between skids, skis, wheels or belts mounted along the side faces of a fixed vehicle frame, driving and supporting wheels for the driving belt mounted in a belt frame, a flexible connecting system between the said vehicle frame and the said belt frame permitting the latter to adopt various height and oblique positions relatively to the former, the improvement wherein the said connecting system includes at least one guide means situated in the vehicle frame and at least one control means pivotably mounted in the belt frame and cooperating with the said guide means so as to permit an adjustment of the relative position of the two said frames, said connecting system comprising between the belt and vehicle frames a pair of transversely extending shafts supported in the belt frame and provided with elbow bent arms forming end portions, an oblique face in said vehicle frame guide means associated and in engagement with said elbow bent arms, each shaft further provided with an arm extending at right angles to the shaft axis, a hydraulic cylinder and piston arrangement interconnecting the free ends of said last named arms, a valve controlling the hydraulic system of the said cylinder and piston arrangement, and a rigid connection between the said valve and the said arm cooperating with the said oblique face.

3. A vehicle as claimed in claim 1, wherein the guide means in the vehicle frame are adjustable.

4. A vehicle as claimed in claim 1, wherein the guide means in the vehicle frame comprises separate portions for each running direction of the vehicle.

References Cited by the Examiner

UNITED STATES PATENTS

| | | | |
|---|---|---|---|
| 1,682,622 | 8/28 | Lofstrom et al. | 180—5 |
| 1,916,375 | 7/33 | Knickerbocker | 180—5 |
| 2,105,042 | 1/38 | Kegresse | 305—27 X |
| 2,860,715 | 11/58 | Bouffort | 305—27 X |

A. HARRY LEVY, *Primary Examiner.*

LEO FRIAGLIA, *Examiner.*